Figure 1:
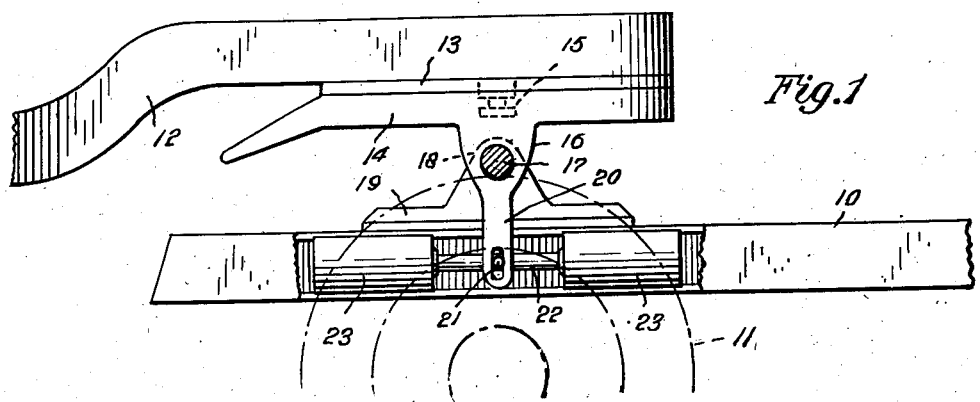

Dec. 18, 1945.  M. E. WEIGAND  2,391,372
TRACTOR STABILIZER
Filed Sept. 12, 1944

Inventor
Maurice E. Weigand
By Frease and Bishop
Attorneys

Patented Dec. 18, 1945

2,391,372

UNITED STATES PATENT OFFICE 2,391,372

TRACTOR STABILIZER

Maurice E. Weigand, Dover, Ohio

Application September 12, 1944, Serial No. 553,741

12 Claims. (Cl. 280—33.1)

The invention relates to tractors and semi-trailers, and more particularly to means for stabilizing the action of the tractor chassis with relation to the semi-trailer chassis so as to provide for greater riding comfort for the driver.

The tractor and semi-trailer combination of motor vehicle is widely used today for transporting all types of commodities, and manufacturers have standardized the size of king pin for the semi-trailer so that it is now possible to couple any standard make of semi-trailer to any standard semi-automatic coupler mounted on the tractor.

These tractor and semi-trailer vehicles ride very hard and have a more or less choppy riding condition which causes considerable discomfort to the driver, resulting in continuous driving of such a vehicle, particularly on long trips, not only causing the driver considerable discomfort but also being frequently injurious to the health of the driver.

In an attempt to overcome this disadvantage many manufacturers have installed a device commonly known as a tractor package comprising lighter material in the front spring of the tractor and the installation of shock absorbers coupling the tractor frame to the front axle thereof.

Such devices have been only partially successful in reducing to an extent the hard riding conditions of the tractor cab since they only stabilized the action of the front axle of the tractor with relation to the remainder of the tractor chassis but had no effect on stabilizing the action of the tractor chassis with relation to the semi-trailer chassis.

It is an object of the present invention to overcome this disadvantage so as to provide greater riding comfort for the driver than is possible under present practice.

Another object is the provision of means for stabilizing the tractor chassis with relation to the semi-trailer chassis.

A further object is to provide a device comprising lever arms rigidly fixed upon the fifth wheel of the tractor and operatively connected to shock absorbers mounted upon the frame of the tractor chassis.

A still further object of the invention is to provide a device of this character in which depending lever arms are rigidly carried by the fifth wheel of the tractor, each arm being pivotedly connected to the pistons of opposed fluid shock absorbers mounted upon the tractor frame.

Still another object is the provision of a stabilizing device which may be easily and readily installed upon any standard type of tractor now in use, and comprising a pair of lever arms for rigid connection to opposite sides of the fifth wheel of the tractor and a shock absorber pivotedly connected to the end of each arm and to the adjacent side of the tractor frame.

Figure 2:
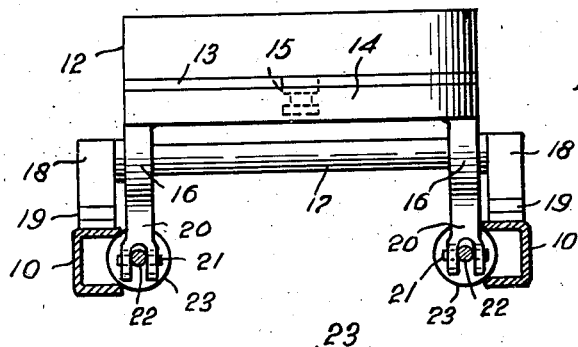
Figure 3:
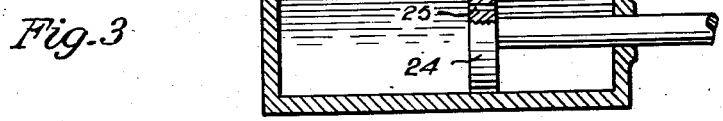
Figure 4:
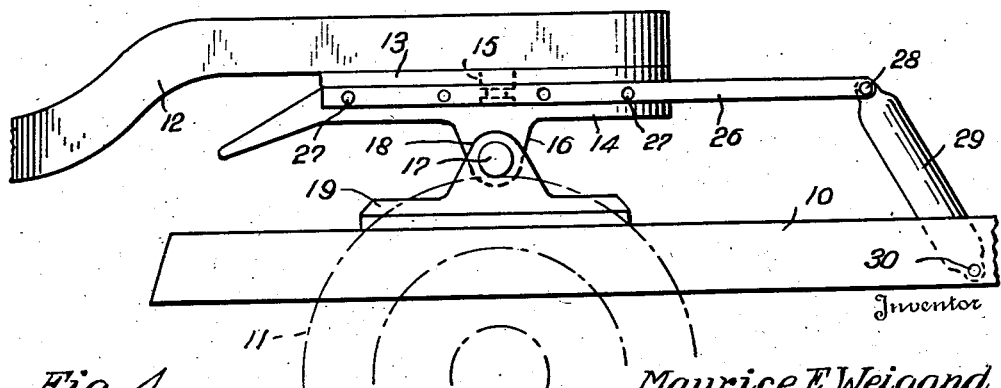

The above objects together with others which will be apparent from the drawing and following description or which may be later referred to, may be attained by constructing the improved stabilizing device in the manner illustrated in the accompanying drawing in which:

Figure 1 is a side elevation, with parts broken away, of parts of a tractor frame and semi-trailer frame showing the improved stabilizing device as applied thereto;

Fig. 2 a transverse sectional view taken as on the line 2—2, Fig. 1;

Fig. 3 an enlarged longitudinal sectional view through one of the hydraulic shock absorber cylinders shown in Figs. 1 and 2; and Fig. 4 a view similar to Fig. 1 showing a form of stabilizer adapted to be installed upon any standard type of tractor now in use.

Referring first more particularly to Figs. 1, 2 and 3, a form of the invention is illustrated which is adapted for cases where a complete new coupler is to be built into the tractor at the time the same is constructed. A portion of the tractor frame is indicated generally at 10 and a rear wheel of the tractor is shown at 11.

The front portion of the trailer frame is indicated generally at 12 and is coupled, as in usual and well known manner, to the tractor frame 10 by means of a fifth wheel type coupler which consists of an upper plate 13, a lower plate 14 and the pin 15.

The usual lugs 16 are formed on opposite sides of the lower plate 14 of the fifth wheel to receive the rocker shaft 17 which is mounted in the bearing portions 18 of the rocker shaft brackets 19 mounted upon the frame members 10 of the tractor.

All of the above described parts are of any usual and ordinary construction in the standard type of tractor and semi-trailer. This structure is modified in order to apply the improved stabilizer by forming depending integral lever arms 20 upon the lugs 16 of the lower plate 14.

The lower end of each lever arm 20 is pivotedly connected as at 21 to the piston rod 22 of the two opposed cylinders 23 which may be of any usual and ordinary type of fluid cylinders, either hydraulic, pneumatic or vacuum operated.

In Fig. 3 is shown a common form of hydraulic cylinder which may be used for the purpose, in which the piston 24 within each cylinder may be provided with a restricted opening 25 so as to permit the fluid within the cylinder to pass slowly therethrough from one side of the piston to the other, thus absorbing shock and controlling the movement of the fifth wheel upon its rocker shaft.

Referring to Fig. 4, a form of the improved stabilizer is illustrated which may be attached to any standard type of tractor and semi-trailer now in use, without disturbing the location of the coupler on the tractor. In this view of the various parts of the tractor, semi-trailer, and coupler are of the same construction as in Figs. 1 and 2 and the same reference numerals are applied thereto.

In order to attach the stabilizer a pair of lever arms 26 is provided, one arm being rigidly attached to each side of the lower plate 14 of the fifth wheel as by the bolts 27, these arms being substantially horizontally disposed and extending for some distance forward of the fifth wheel of the tractor, and the forward end of each arm being pivotedly connected as at 28 to the upper end of a standard type of hydraulic shock absorber shown generally at 29, the lower end of the shock absorber being pivotedly connected as at 30 to a convenient point upon the tractor frame 10.

The desired stabilization may be obtained by increasing or decreasing the length of the lever arms 26, beyond the fifth wheel and by providing shock absorbers of suitable diameter to produce the desired results.

With this construction it has been found that the action of the tractor chassis with relation to the semi-trailer chassis is stabilized and the riding condition of the tractor is greatly improved so that greater driving comfort is achieved.

I claim:

1. In combination with a tractor and semi-trailer having cooperating upper and lower fifth wheel members providing a vertical pivotal connection, a horizontal transversely disposed rocker shaft providing pivot means for connecting the lower fifth wheel member to the tractor, a lever arm rigidly mounted upon the lower fifth wheel member and a resilient hitch carried by the tractor frame and connected to the end of said lever arm to resist pivotal movement of the lower fifth wheel member in either direction around the horizontal, transversely disposed rocker shaft.

2. In combination with a tractor and semi-trailer having cooperating upper and lower fifth wheel members providing a vertical pivotal connection, a horizontal transversely disposed rocker shaft providing pivot means for connecting the lower fifth wheel member to the tractor, a depending lever arm rigidly mounted upon the lower fifth wheel member and a resilient hitch carried by the tractor frame and connected to the end of said lever arm to resist pivotal movement of the lower fifth wheel member in either direction around the horizontal, transversely disposed rocker shaft.

3. In combination with a tractor and semi-trailer having cooperating upper and lower fifth wheel members providing a vertical pivotal connection, a horizontal transversely disposed rocker shaft providing pivot means for connecting the lower fifth wheel member to the tractor, a substantially horizontal lever arm rigidly mounted upon the lower fifth wheel member and a resilient body carried by the tractor frame and connected to the end of said lever arm to resist pivotal movement of the lower fifth wheel member in either direction around the horizontal, transversely disposed rocker shaft.

4. In combination with a tractor and semi-trailer having cooperating upper and lower fifth wheel members providing a vertical pivotal connection, a horizontal transversely disposed rocker shaft providing pivot means for connecting the lower fifth wheel member to the tractor, a substantially horizontal lever arm rigidly attached to the lower fifth wheel member and a resilient body carried by the tractor frame and connected to the end of said lever arm to resist pivotal movement of the lower fifth wheel member in either direction around the horizontal, transversely disposed rocker shaft.

5. In combination with a tractor and semi-trailer having cooperating upper and lower fifth wheel members providing a vertical pivotal connection, a horizontal transversely disposed rocker shaft providing pivot means for connecting the lower fifth wheel member to the tractor, a lever arm rigidly mounted upon the lower fifth wheel member, a pair of opposed resilient bodies mounted upon the tractor frame and a common piston rod for said resilient bodies connected to the end of said lever arm to resist pivotal movement of the lower fifth wheel member in either direction around the horizontal, transversely disposed rocker shaft.

6. In combination with a tractor and semi-trailer having cooperating upper and lower fifth wheel members providing a vertical pivotal connection, a horizontal rocker shaft mounted upon the tractor frame upon which the lower fifth wheel member is pivoted, depending rigid arms upon opposite sides of the lower fifth wheel member extending below said rocker arm, a pair of opposed resilient bodies mounted upon each side of the tractor frame and a common piston rod for each pair of resilient bodies connected to the end of the adjacent lever arm to resist pivotal movement of the lower fifth wheel member in either direction around the horizontal, transversely disposed rocker shaft.

7. In combination with a tractor and semi-trailer having cooperating upper and lower fifth wheel members providing a vertical pivotal connection, a horizontal rocker shaft mounted upon the tractor frame, upon which the lower fifth wheel member is pivoted, a substantially horizontal arm attached to each side of the lower fifth wheel member and a resilient body connected to the end of each arm and to the tractor frame to resist pivotal movement of the lower fifth wheel member in either direction around the horizontal, transversely disposed rocker shaft.

8. In combination with a tractor and semi-trailer having cooperating upper and lower fifth wheel members providing a vertical pivotal connection, a horizontal, transversely disposed rocker shaft providing pivotal means for connecting the lower fifth wheel member to the tractor, a rigid arm attached at one end to the lower fifth wheel member and stabilized at the other end by a flexible hitch to the tractor frame to resist pivotal movement of the lower fifth wheel member in either direction around the horizontal, transversely disposed rocker shaft.

9. In combination with a driven vehicle and a drawn vehicle having cooperating upper and lower fifth wheel members providing a vertical pivotal connection, a horizontal, transversely disposed rocker shaft providing horizontal pivotal means between one fifth wheel member and one vehicle, a resilient hitch connected to the pivoted fifth wheel member and to the last named vehicle to resist movement of the pivoted fifth wheel member in either direction around the horizontal pivot means.

10. In combination with a tractor and semi-trailer having cooperating upper and lower fifth wheel members providing a vertical, pivotal connection, a horizontal, transversely disposed rocker shaft providing pivot means for connecting the lower fifth wheel member to the tractor frame, a depending lever arm rigidly mounted upon the lower fifth wheel member and a resilient body carried by the tractor frame and connected to the end of said lever arm to resist pivotal movement of the lower fifth wheel member in either direction around the horizontal, transversely disposed rocker shaft.

11. In combination with a driven vehicle and a drawn vehicle having cooperating fifth wheel members providing a vertical, pivotal connection, a horizontal, transversely disposed rocker shaft providing pivot means for connecting one of the fifth wheel members to one of the vehicles, a lever arm rigidly mounted upon the pivoted fifth wheel member and a resilient body connecting said lever arm to the last named vehicle to resist movement of the pivoted fifth wheel member in either direction around the horizontal, transversely disposed rocker shaft.

12. In combination with a driven vehicle and a drawn vehicle having cooperating fifth wheel members providing a vertical, pivotal connection, a horizontal, transversely disposed rocker shaft providing pivot means for connecting one of the fifth wheel members to one of the vehicles, and resilient means connected to the pivoted fifth wheel member and to the last named vehicle to resist movement of the pivoted fifth wheel member in either direction around the horizontal, transversely disposed rocker shaft.

MAURICE E. WEIGAND.